United States Patent
Ziesler et al.

(10) Patent No.: US 9,570,865 B1
(45) Date of Patent: Feb. 14, 2017

(54) ELECTRICAL BOX HAVING A REMOVABLE MODULE WITH A CHARGING CONNECTOR

(71) Applicants: Sebastian H Ziesler, Park City, UT (US); Alexandra Ziesler, Park City, UT (US)

(72) Inventors: Sebastian H Ziesler, Park City, UT (US); Alexandra Ziesler, Park City, UT (US)

(*) Notice: Subject to any disclaimer, the term of this patent is extended or adjusted under 35 U.S.C. 154(b) by 0 days.

(21) Appl. No.: 14/813,477

(22) Filed: Jul. 30, 2015

(51) Int. Cl.
*H01R 13/60* (2006.01)
*H01R 13/72* (2006.01)
*H02J 7/00* (2006.01)
*H01R 25/00* (2006.01)
*H01R 27/02* (2006.01)
*H01R 13/703* (2006.01)
*H01R 13/66* (2006.01)
*H05K 7/20* (2006.01)

(52) U.S. Cl.
CPC .......... *H01R 13/72* (2013.01); *H01R 13/6691* (2013.01); *H01R 13/703* (2013.01); *H01R 25/006* (2013.01); *H01R 27/02* (2013.01); *H02J 7/0042* (2013.01); *H05K 7/20509* (2013.01)

(58) Field of Classification Search
CPC ..... H01R 25/003; H01R 25/006; H01R 31/02; H01R 31/065; H01R 13/60; H01R 13/66; H01R 13/6395; H01R 24/525
USPC .... 439/107, 535, 485, 638; 174/53; 200/297
See application file for complete search history.

(56) References Cited

U.S. PATENT DOCUMENTS

| | | | | | |
|---|---|---|---|---|---|
| 6,923,663 | B2* | 8/2005 | Oddsen | ............... | H01R 25/006 439/107 |
| 7,893,567 | B1* | 2/2011 | Deros | ................. | H02G 3/0431 307/147 |
| 8,758,031 | B2* | 6/2014 | Cheng | ..................... | H05K 5/02 439/107 |
| D720,295 | S * | 12/2014 | Dodal | ....................... | D13/139.1 |
| 9,312,673 | B2* | 4/2016 | Byrne | ....................... | H02G 3/12 |
| 2008/0012423 | A1* | 1/2008 | Mimran | ............... | H01R 25/003 307/11 |
| 2008/0160826 | A1* | 7/2008 | Lamoureux | ........... | H01R 27/02 439/535 |
| 2012/0292991 | A1* | 11/2012 | Dodal | ..................... | H02H 3/16 307/11 |
| 2016/0172808 | A1* | 6/2016 | Lauby | .................... | H01R 27/02 348/730 |

* cited by examiner

*Primary Examiner* — Chandrika Prasad

(57) ABSTRACT

This invention disclosure is an electrical outlet receptacle containing the high voltage AC side and low voltage DC power supply used typically for charging and/or powering portable electronic devices. The charge connector for interfacing with the portable device is contained in a removable module. Furthermore the removable module may contain a retractable charge cord or charge cords, charge status indicator lights, power supply switches, and it also may contain a portion of the power supply control circuitry to provide the particular power and signaling required to interface with the specific portable device. The other portion of the power supply and control circuitry would be contained in the fixed portion of the receptacle and/or the electrical box. Finally there may be additional heat sinks to provide enough thermal dissipation from the power supply.

20 Claims, 8 Drawing Sheets

ELECTRICAL BOX HAVING A REMOVABLE MODULE WITH A CHARGING CONNECTOR

CROSS-REFERENCE TO RELATED APPLICATIONS

Not Applicable

BACKGROUND OF THE INVENTION

1. Field of the Invention

The present application is related to an AC electrical receptacle containing charging connectors for portable electronic devices where said charging portion of the electrical receptacle can be easily upgradeable to future portable electronic device charging and power standards by use of a removable module.

2. Technical Background

The past several years has seen a proliferation of portable electronic devices. Smart phones, tablets, laptops, game pads, cameras, portable lights, and electronic toys to name a few. One commonality amongst all these portable electronic devices is the need to recharge their respective batteries. Several strategies by portable electronic device manufactures for charging said batteries have been removable batteries and a charging adapter which plug into an AC high voltage wall electrical receptacle, a charging adapter with proprietary plug to attach to the portable electronic device, a charging adapter with standardized plug such as micro USB to attach to the portable electronic device for charging, and inductive charging pad to wirelessly charge the portable electronic device while in close proximity to the portable electronic device. The drawback of all these approaches is the adapter and charge cord required. Adapters and charge cords have the down side of easily being lost by the user, incompatibility between one adapter and a different portable electronic device, incompatibility between the adapter and future similar portable electronic devices, and safety issue of the 'wall wart' style adapter being easy to bump and partially expose the high voltage prongs.

Inventors have come up with solutions which address some concerns but not all. Current state of the art approaches include electrical receptacles containing USB type A connector or connectors and an associated low voltage switching power supply used for powering the USB type A plugs. However that technology implementation does not eliminate the issue of requiring a charge cord to connect from the USB plug in the electrical receptacle to the portable electronic device. These charge cords can easily be lost. Another issue is unsightliness if one keeps the charge cord plugged into the electrical receptacle at all times. Furthermore current technology implementations do not address future compatibility where the portable electronic device may require different power or signaling requirements. Current technology does not address the safety issue of young children attempting to plug wires into outlets—a young child may not distinguish between the USB type A socket and high voltage AC socket.

Other proposed inventions include a retractable charge cord inside the electrical receptacle. However since the charge cord is part of the electrical receptacle and not part of a removable module, the electrical receptacle will not work with portable electronic devices with different style charge connectors. Since all electrical receptacles are 'hard wired' to a building's high voltage wiring and replacing it may require a municipal electrical permit and an electrician to perform the work, both which are costly and time consuming. Also the future compatibility issue remains where even if the same plug style is included in future portable electronic devices, the power requirement and signaling protocol required by the portable electronic device may be different. Furthermore, retractable charge cords can easily break if one pulls on them with excessive force rendering the electrical receptacle broken and an expensive electrician service call to replace said electrical receptacle.

Another drawback with current electrical receptacles with built in low power supplies is the limited amount of low voltage DC power said electrical receptacle can provide due to thermal constraints. Power supplies have two inherent constraints. First, no power supply is 100% efficient and the un-efficient portion of the power is converted into heat which must be dissipated by the electrical receptacle. Second, there is a limited amount of heat which can be dissipated inside a wall electrical box. For example, an 80% efficiency 100 Watt power supply would need to dissipate 25 Watts which exceeds the power dissipation capability of a traditional electrical box while remaining within industry standards of acceptable temperatures within said electrical box.

Hence there is a need for an invention which solves the aforementioned issues of appearance, safety, upgradability to future charging standards, repair of components of limited life span, and thermal limitations.

3. Background Art

U.S. Pat. No. 8,758,031 "Electrical wiring device with high current USB charging capabilities"

SUMMARY OF THE INVENTION

The present invention addresses the preceding detailed needs and provides the electrical receptacle with a removable module containing the charging connector or connectors and provides for improved thermal dissipation.

One embodiment of the present invention is a retractable charge cord or plurality of retractable charge cords contained in the removable module. The removable module may contain indicator lights which indicate charging status. A switch may be provided to disable the indicator lights. The removable module may also contain a switch (e.g., phantom power switch) for deactivating the switching power supply thus cutting phantom power usage to zero while the charger is not in use. The phantom power switch may be a stand-alone switch or it may be built into the retractable charge cord, such that when the charge cord is fully retracted, the switch is deactivated. The phantom power switch may also be partially contained in the fixed portion of the electrical receptacle and partially contained in the removable module. The high voltage electrical portion of the phantom power switch would be contained in the fixed portion and a push lever or other apparatus for toggling the phantom power switch would be embedded in the removable module. The push lever is activated by the charge cord being fully retracted or by a toggle or button switch.

Another aspect of this invention is low voltage control circuitry contained in the removable module where the control circuitry is used to control the non-removable portion of the AC high voltage power supply such that the desired power—voltage and amperage—is generated from the fixed AC high voltage power supply and that signaling appropriate for the targeted portable electronic device is presented on the charging connector and can be used to communicate with the targeted portable electronic device in order to determine the desired power amount and type. One embodiment of this control circuitry can meet the USB power delivery 2.0 specification which includes a signaling protocol to switch the output voltage and amperage from the default of 5V to higher voltage and higher amperage. This control circuitry connects from the removable module to the fixed portion of the AC high voltage power supply by any electrical connector readily apparent to those skilled in the art.

Yet another aspect of this invention is means of providing additional thermal dissipation from the electrical receptacle through a thermal bridge. A heat sink is attached to or is part of the electrical box which houses the electrical receptacle. A thermal bridge connection is provided between the portions of the switching AC high voltage power supply which generates the majority of the waste heat, typically this is the flyback transformer, the high voltage switching transistor, and the output diodes. Some power supply incarnations may also include a buck regulator. This buck regulator and associated transistor switch or switches are other examples of components in the AC high voltage power supply which produces significant waste heat and could be attached to the thermal bridge. A thermal bridge has several embodiments which are detailed in the figures below and of which would be apparent to those skilled in the art.

Another embodiment of the present invention is that the high voltage portion of the AC high voltage power supply is contained in the electrical box rather than in the electrical receptacle itself. Housing the high voltage AC portion in the electrical box is done to allow for more physical space and more thermal dissipation than would be possible by housing it in the electrical receptacle alone. The invention then allows for multiple removable modules to be attached to a single fixed portion of the AC high voltage power supply, which saves money in manufacturing and end-user installation due to the lower requirement of power supply units.

DETAILED DESCRIPTION

References are made to the section lines in the accompanying drawings. Where possible, the same section line is used in multiple figures where the same item is referred to in the different figures.

The described invention consists of several main parts. The first main part is the removable module (1). The second main part is the electrical receptacle (6). Finally the electrical box (14) and AC high voltage power supply (12) are necessary components to make a complete system.

Figure 1:
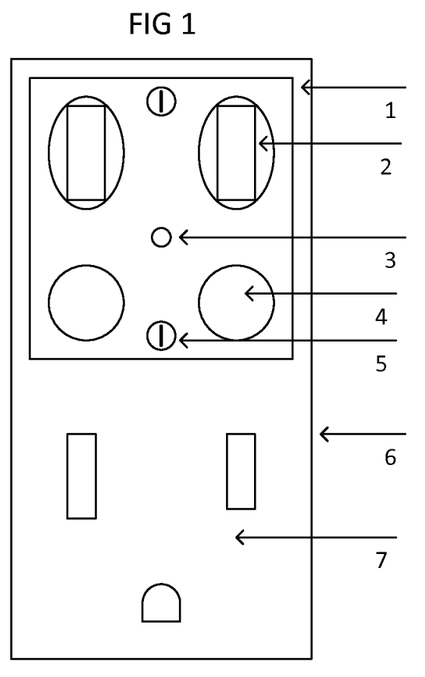
FIG. 1 is front view of an embodiment of an electrical receptacle with one removable module containing two retractable charge cables, a charge indicator light, retractor release push buttons, and screws to attach the removable module to the fixed electrical receptacle. The example electrical receptacle shown also contains one standard 15 A high voltage electrical socket.

The removable module (1) typically would be constructed of an insulating plastic material similar to that used in existing electrical receptacles. The removable module (1) contains the charge connector (2). The charge connector (2) can be a micro-usb connector, usb type c connector, other standards based connector or a proprietary connector specific to a particular product such as a Dell laptop power connector. The removable module (1) can be swapped out for another removable module with a different charge connector based on the type of portable electronic device connector that is required for the portable electronic device to be charged. These can be interchanged without disturbing the fixed electrical receptacle (6). Also the removable module (1) may contain more than one charge connector (2) as depicted in FIG. [1]. The removable module (1) may contain a charge indicator light (3) and potentially a switch to disable said charge indicator light (3) for applications which the user may not want excess light, such as a bedroom or photographic dark room. The charge indicator light (3) typically would consist of a LED type or multiple LEDs and could be multicolored—the color and number of lights being displayed being used to indicate to the user the amount of charge being sent to the portable electronic device. For example one green light could indicate 1 Amp 5 Volts, two green lights could indicated 2 Amps 5 Volts, one red light could indicate 1 Amp 12 Volts, two red lights could indicate 2 Amps 12 Volts. Removable module (1) may contain screws (5) to securely fasten the removable module (1) to the electrical receptacle (6). An alternate screw-less mounting mechanism could consist of friction or locking clips. The removable module (1) may contain one release button (4) per charge connector (2) used to release the charge connector from the removable module (1).

Figure 4:
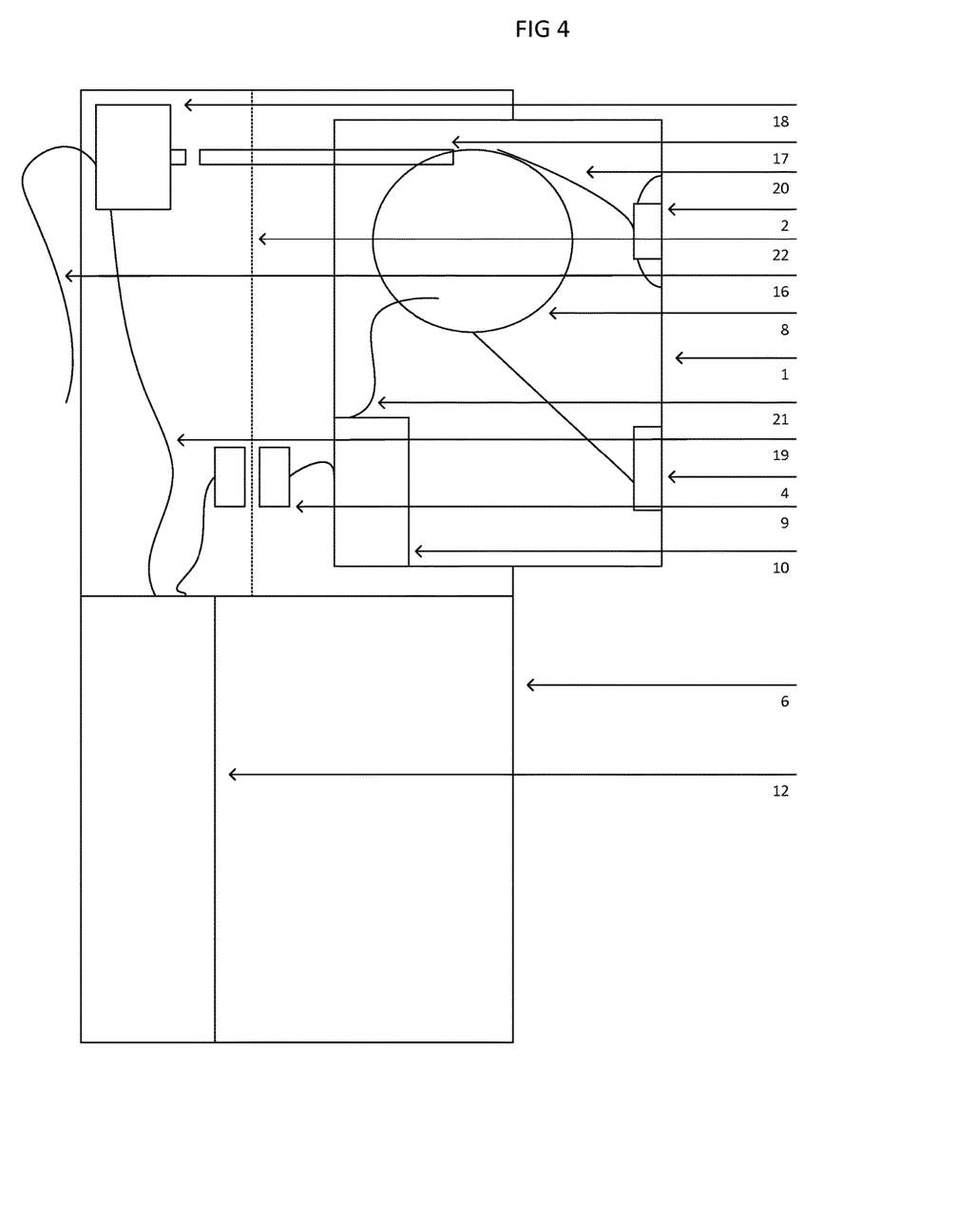
FIG. 4 is a side view showing the phantom power switch button in the removable module and the phantom power switch in the fixed portion of the electrical receptacle.
Figure 5:
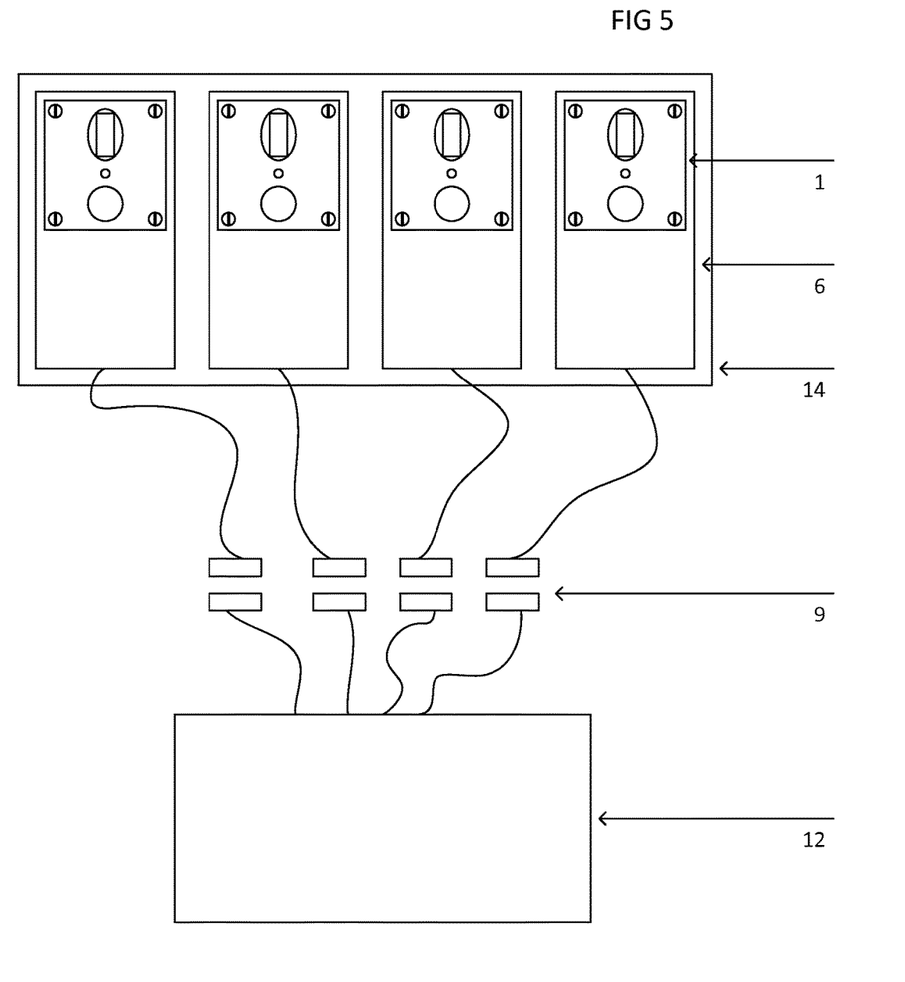
FIG. 5 is a multi-module charging station with multiple removable modules attached to a single AC high voltage power supply.

Inside the removable module (1) there consists several sub-systems as shown in FIG. [4]. The charge connector (2) connects by electrical cable (20) to the cable retractor mechanism (8). Typically this electrical cable (20) would be light weight and flexible such that it can wind up in the cable retractor mechanism (8) without binding. Length of the electrical cable is relatively short, in the one foot to three foot range. The retractor mechanism (8) may contain a locking feature so that the cable remains extended at the desired length until the lock is released with the release button (4). Another type of retractor mechanism may use a pull-to-release function rather than a push button release similar to any retractable car seat belt. The design of such retraction mechanism would be readily apparent to one fluent in said field. The retractor mechanism (8) connects to the removable module power supply (10) by another electrical cable (21). Alternately, functions of the retractor mechanism (8) and removable module power supply (10)

may be in a single unit, thereby eliminating the need for cable (21) and reducing the total number of components in the device. A linkage or pushrod (17) extends out of the removable module (1) for activating the phantom power switch (18). This linkage or pushrod (17) typically would be made of a non-conductive material as the phantom power switch (18) conducts high voltage. The linkage or pushrod (17) passes the interior of the electrical receptacle cavity partition wall (22). The linkage or pushrod (17) can either be activated by the charge connector (2) being fully seated in the removable module (1) or by an additional switch button or toggle (not shown in the drawings) on the face of the removable module (1). Thus, the removable module (1) is isolated from the high voltage electricity. The removable module power supply (10) contains the control circuitry necessary to communicate with the electronic device being charged to determine the amount of charge to be provided. It also contains power conversion and switching to convert the low voltage coming out of the AC high voltage power supply (12) into the type of power indicated by the control circuitry. Such control circuitry and switching already exists in the industry and needs not be described in further detail here. Finally a DC low voltage electrical connector and cables (9) connect the removable module power supply (10) with the AC high voltage power supply (12).

Figure 2:
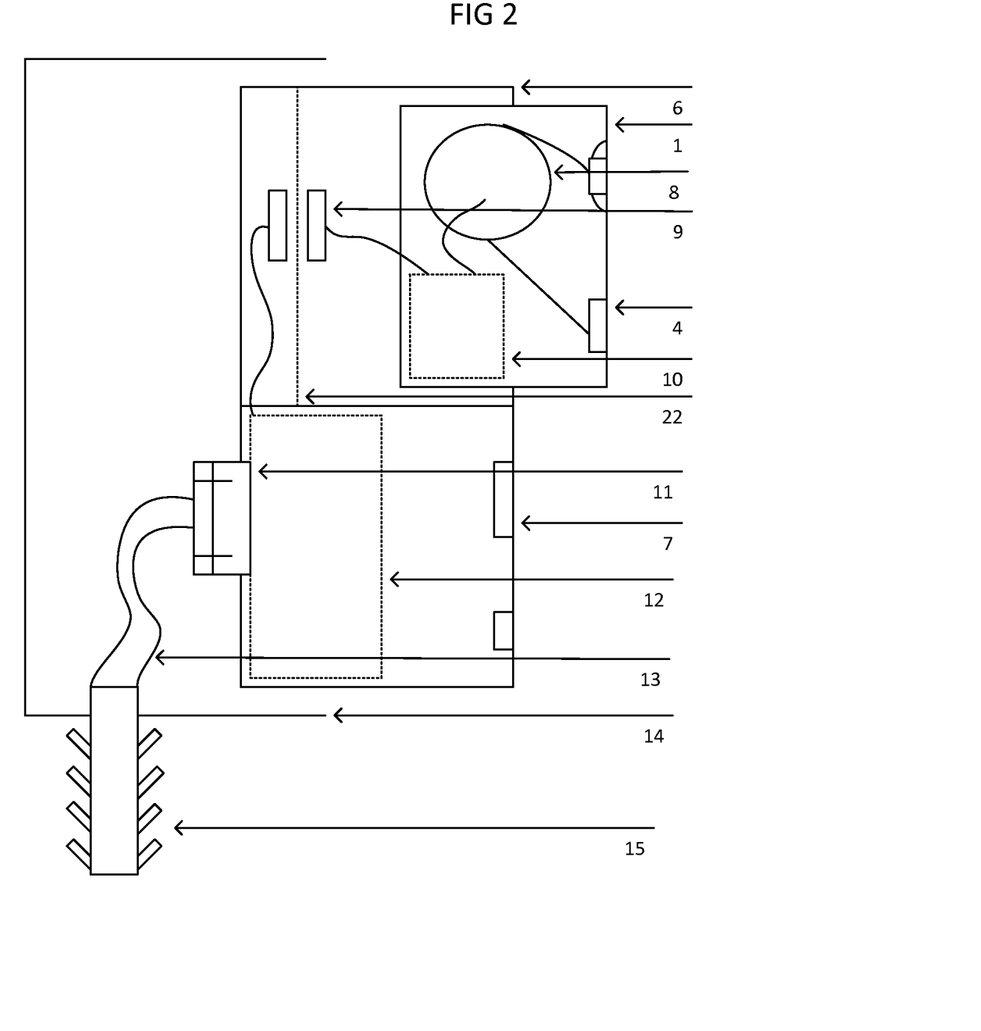
FIG. 2 is an exploded side view of an embodiment of an electrical box with a heat sink and semi-flexible heat sink cable connected to the high voltage portion of the AC high voltage power supply in the electrical receptacle, the removable module with the control portion of the power supply and its DC low voltage connector, the retractor with retraction lock release button.

The electrical receptacle (6), also called the fixed module (6) shown in FIG. [2] is similar in size and shape of existing electrical outlets, single gang size. The electrical receptacle (6) contains a cavity for the removable module (1). It may contain two or more such cavities depending on the space available and the size of the removable module (1). A partition wall (22) separates the potential high voltage side from the user replaceable removable module (1). The wall (22) has mounting holes for screws (5) or has mechanical interface for locking clips used to secure the removable module (1) to the fixed portion of the electrical receptacle (6). The front face of the fixed module or electrical receptacle (6) is intended to be flush with the wall plate, similar to a standard electrical outlet.

The electrical receptacle (6) may be multi-functional and may contain features found in traditional electrical receptacles. Some examples, while not an exhaustive list are a 15 A 120V electrical socket (7) shown in FIG. [1], a light switch, fan control switch, or light dimmer. The electrical receptacle (6) may contain an internal high voltage switch, normally closed type switch. When the linkage or pushrod (17) is pressed against the switch from the retractor cable (20) being fully retracted, the switch is opened, thereby disconnecting the high voltage electricity from the AC high voltage power supply (12). When the cable (20) is retracted, the invention cuts waste phantom power dissipation of the AC high voltage power supply (12) to zero. The electrical receptacle (6) may also contain the AC high voltage power supply (12) as shown in FIG. [4]. However the AC high voltage power supply (12) may also be located in or near the electrical box (14) depending on the physical dimensions of the AC high voltage power supply (12). Typically the higher maximum power capable of being delivered by the AC high voltage power supply (12), the larger the physical dimensions and the electrical receptacle (6) only has a certain amount of room in it based on the dimensions of a traditional 1-gang electrical outlet. Also, there may be certain embodiments which have a heat sink connector (11), thermal bridge (13) and heat sink (15) to remove excess waste heat from the AC high voltage power supply (12) when the amount of waste heat cannot be dissipated inside the electrical receptacle (6). Finally if the AC high voltage power supply (12) is contained inside the electrical receptacle (6), there are either high voltage wires (16) to connect to the building's electrical wiring, typically using wire nuts, or terminals on the electrical receptacle for directly attaching the building's electrical wiring. Such terminals are apparent to those skilled in the art.

Figure 3:
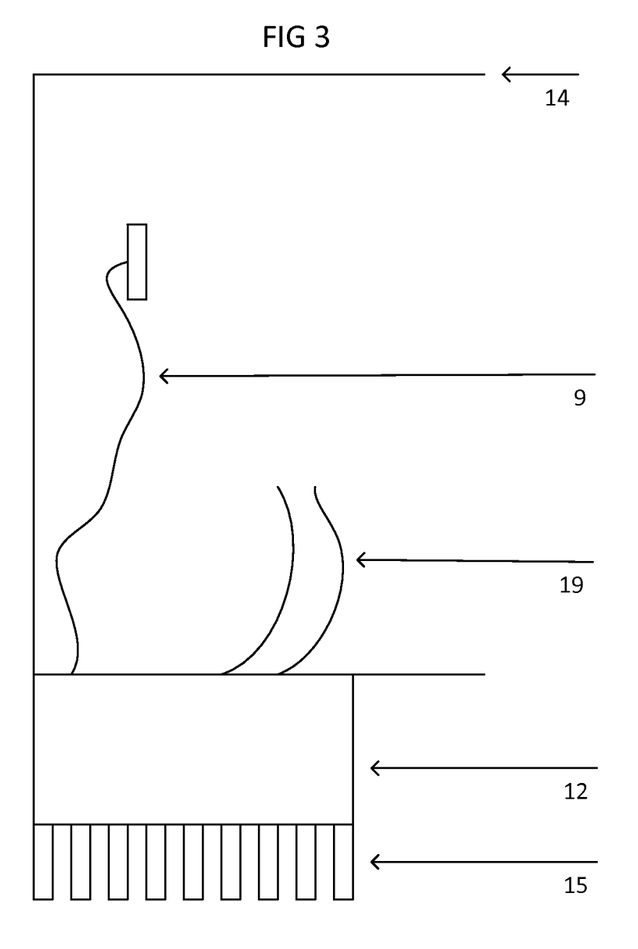
FIG. 3 is a side view of an embodiment of an electrical box with built in AC high voltage power supply and built in heat sink.

The electrical box (14) shown in FIG. [2] could be a traditional metallic or non-metallic electrical box, 1-gang, 2-gang, or more-gang style. Such electrical boxes are permanently attached to a building's structure. For embodiments where the AC high voltage power supply (12) is not contained in the electrical receptacle (6), the AC high voltage power supply would be either attached to or built into the electrical box (14) as shown in FIG. [3]. High voltage wires or AC high voltage connector (19) would be provided to attach to the electrical receptacle (6) and to the phantom power switch (18). Or if no phantom power switch (18) were provided, the AC high voltage power supply (12) would contain high voltage wires to connect to the building wiring using wire nuts or other similar electrical attachment.

Figure 6:
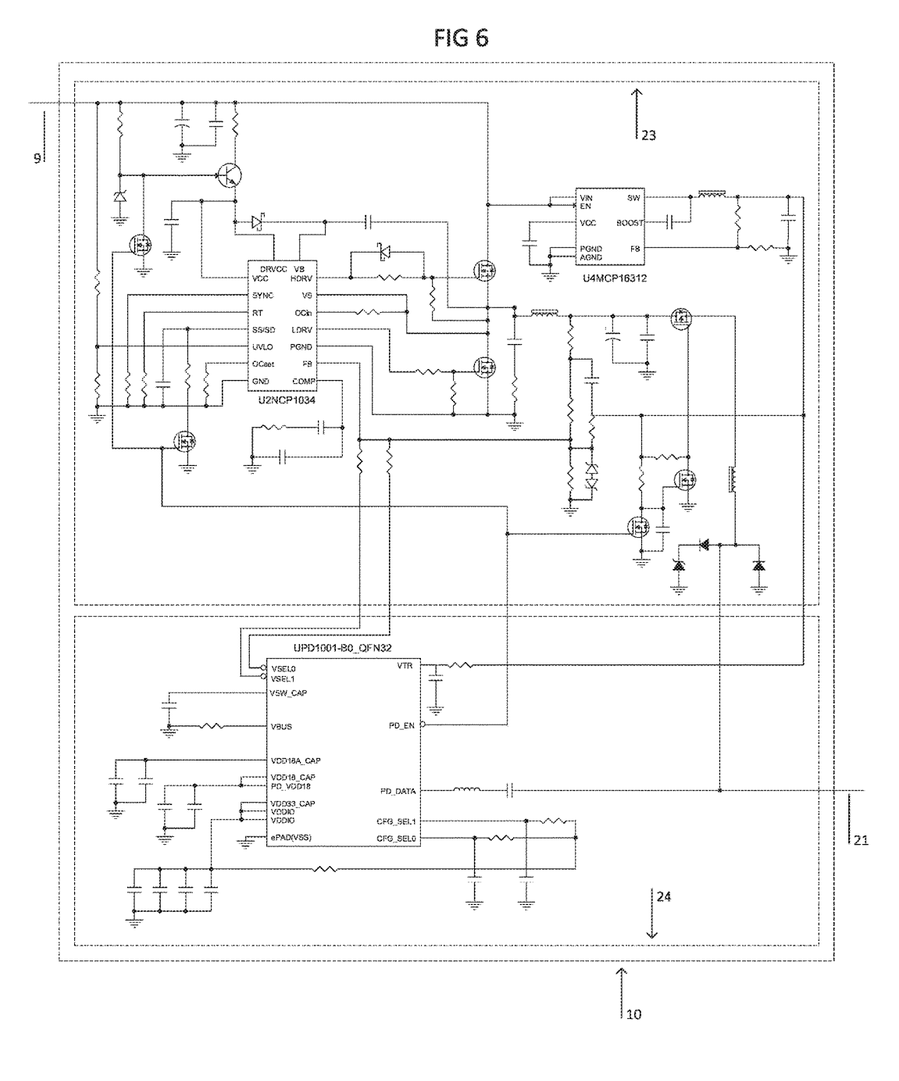
FIG. 6 is a schematic of a removable module power supply containing control circuitry in the lower half of the schematic and power conversion and switching in the upper half of the schematic.

FIG. 6 shows that the control circuit (24) communicates with the attached portable device over the electrical cable (21) to determine the amount of power to send to the portable device. The control circuit (24) sends the signaling to the power conversion and switching (23) to enable the specified output voltage and current to be delivered over the electrical cable (21). The power conversion and switching (23) takes the input DC voltage over the electrical cable (9) and converts to the specified output voltage on electrical cable (21).

Figure 7:
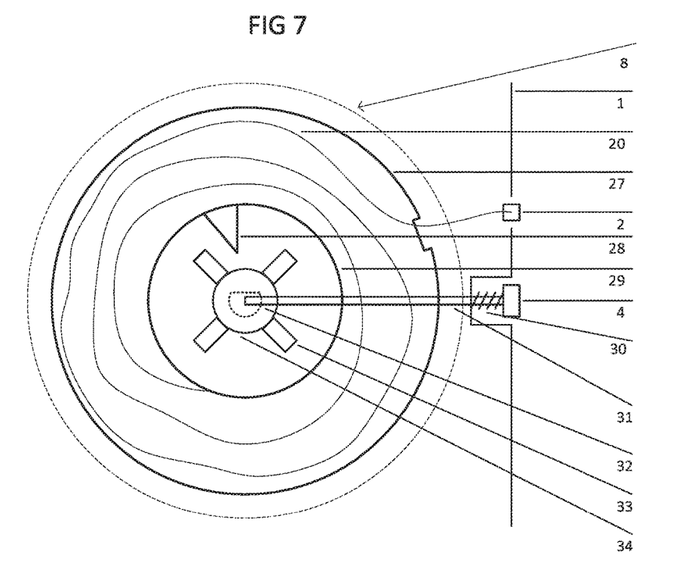
FIG. 7 is a schematic of a cable retractor mechanism with a button to push to release.

FIG. 7 shows that the spring loaded floating cable spool (29) rotates on the keyed center post (32) of the cable retractor mechanism housing (27). The keying of the center post (32) prevents the floating center cap (34) from rotating. The angled wings (33) of the floating center cap (34) allow the cable spool (29) to rotate freely in the cable-extract direction, but the angled wings (33) lock against the floating cable spool tab (28) when the spool (29) attempts to rotate in the cable retract direction, thus locking the extracted cable (20) at a certain length. The spring loaded (30) push button (4) and push button to center cap linkage (31) slides the center cap (34) down the center post (32) thereby releasing the angled wings (33) from the cable spool tab (28). This allows the spool (29) to then freely rotate in the cable retract direction and retract the cable (20).

Figure 8:
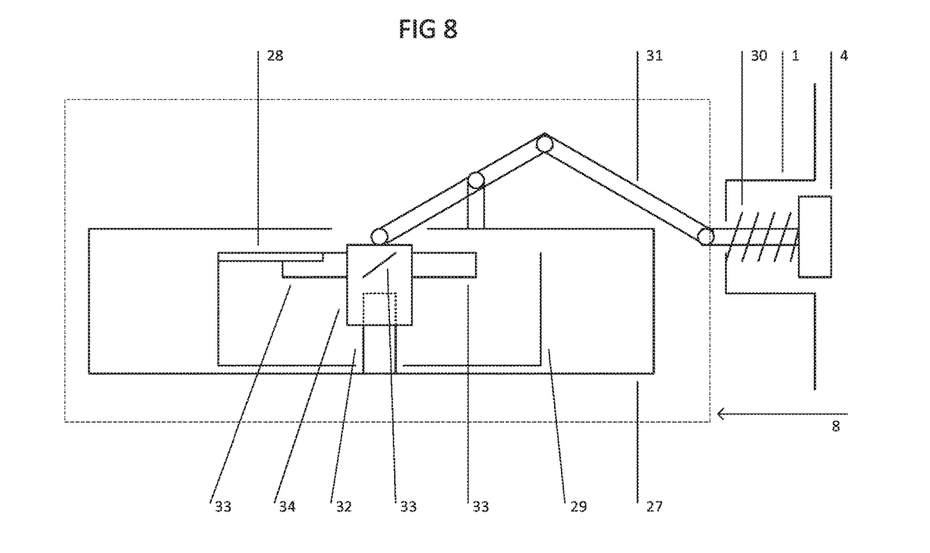
FIG. 8 is a schematic of a cable retractor mechanism with a push to release linkage.

FIG. 8 shows that the linkage (31) pushes the center cap (34) down when the release button (4) is pressed. The spring (30) causes the linkage (31) to pull the center cap (34) up when the release button (4) is not being pressed.

Figure 9:
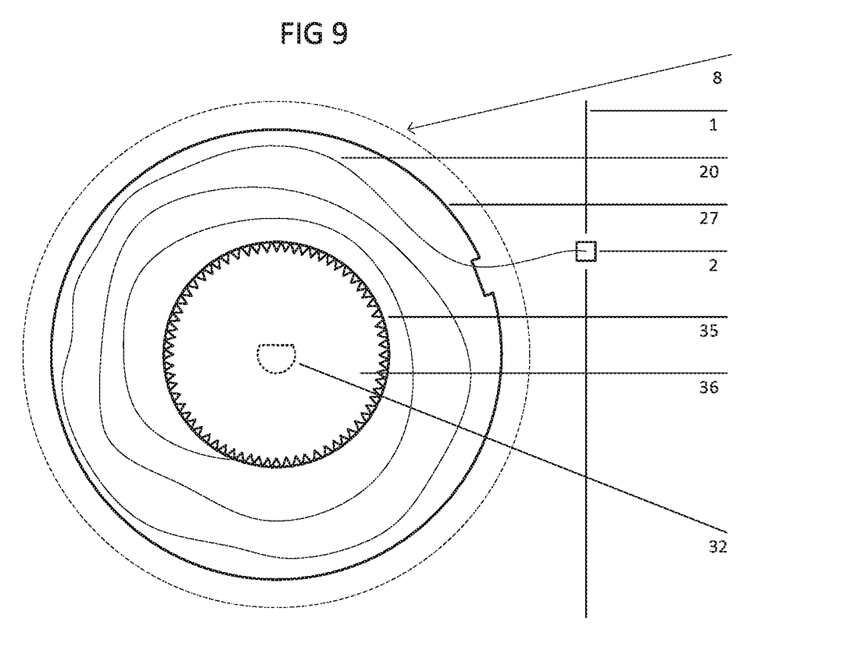
FIG. 9 is a schematic of a cable retractor mechanism with a pull cable to release mechanism.

FIG. 9 shows that the sliding center cap with angled locking teeth (36) slides up and down on the keyed center post (32). The mating angled locking teeth of the spool (35) cause the center cap (36) to prevent the spool from winding in the cable retract direction on the first pull of the cable (20) but on the second pull of the cable (20) the center cap (36) slides again thus allowing the spool (35) to wind in the cable retract direction upon release of the second pull of the cable (20). This pull to release mechanism operates in a similar manner to a car seat belt retractor and the construction and operation details of the cable retractor mechanism would be familiar to one skilled in such art.

What is claimed is:
1. An electrical assembly comprising:
   an electrical box;
   an AC high voltage connector in the electrical box and being electrically coupled with an AC high voltage power supply; and an electrical receptacle located in the electrical box, the electrical receptacle having a cavity;
a removable module removably located in the cavity, the removable module comprising:
at least one charge connector configured to couple with an electronic device;
a removable module power supply electrically coupled to the at least one charge connector; and
a DC low voltage electrically connector configured to electrical couple the removable module power supply with the AC high voltage power supply when the removable module is in the cavity.

2. The electrical assembly of claim 1, comprising a means for fastening the removable module to the electrical receptacle.

3. The electrical assembly of claim 1, wherein the AC high voltage connector is attached to the electrical receptacle.

4. The electrical assembly of claim 1, comprising the AC high voltage power supply in the electrical box.

5. The electrical assembly of claim 3, wherein the AC high voltage power supply is in the electrical receptacle.

6. The electrical assembly of claim 1, comprising the AC high voltage power supply external to the electrical box.

7. The electrical assembly of claim 1, wherein the removable module further includes at least one charge cord having the at least one charge connector.

8. The electrical assembly of claim 7, wherein the removable module includes a retractor mechanism attached to the at least one charge cord such that the charge cord is extendable from and retractable into the removable module.

9. The electrical assembly of claim 8, wherein the retractor mechanism includes a locking mechanism.

10. The electrical assembly of claim 8, wherein the locking mechanism includes a pull-to-release mechanism.

11. The electrical assembly of claim 8, wherein the locking mechanism includes a release button.

12. The electrical assembly of claim 4, further comprising a phantom power switch in the electrical box that electrically couples and decouples an external power supply to the AC high voltage power supply.

13. The electrical assembly of claim 8, comprising a means for activating and deactivating the phantom power switch.

14. The electrical assembly of claim 8, further comprising a phantom power switch in the electrical box that electrically couples and decouples an external power supply to the AC high voltage power supply, wherein the phantom power switch is operably coupled to the retractor mechanism such that when the charging cord is extended therefrom the external power supply is electrically coupled to the AC high voltage power supply or when the charging cord is retracted the external power supply is electrically decoupled from the AC high voltage power supply.

15. The electrical assembly of claim 12, the removable module including a button operably coupled to the phantom power switch.

16. The electrical assembly of claim 1, wherein the removable module power supply includes control circuitry and power conversion and switching components configured to convert voltage coming out of the AC high voltage power supply into power indicated by the control circuitry.

17. The electrical assembly of claim 5, wherein the removable module power supply includes control circuitry configured to communicate with the portable electronic device to be charged to determine power amount and type for a portable electronic device.

18. The electrical assembly of claim 1, wherein the removable module further includes an indicator light configured to specify an amount of electricity provided to the portable electronic device.

19. The electrical assembly of claim 4, further comprising a heat sink coupled with the AC high voltage power supply via a thermal bridge.

20. The electrical assembly of claim 1, wherein the electrical receptacle further includes a high voltage electrical socket.

* * * * *